(No Model.) 2 Sheets—Sheet 1.
H. F. LONGWORTH.
STALK FODDER HARVESTER.
No. 450,244. Patented Apr. 14, 1891.
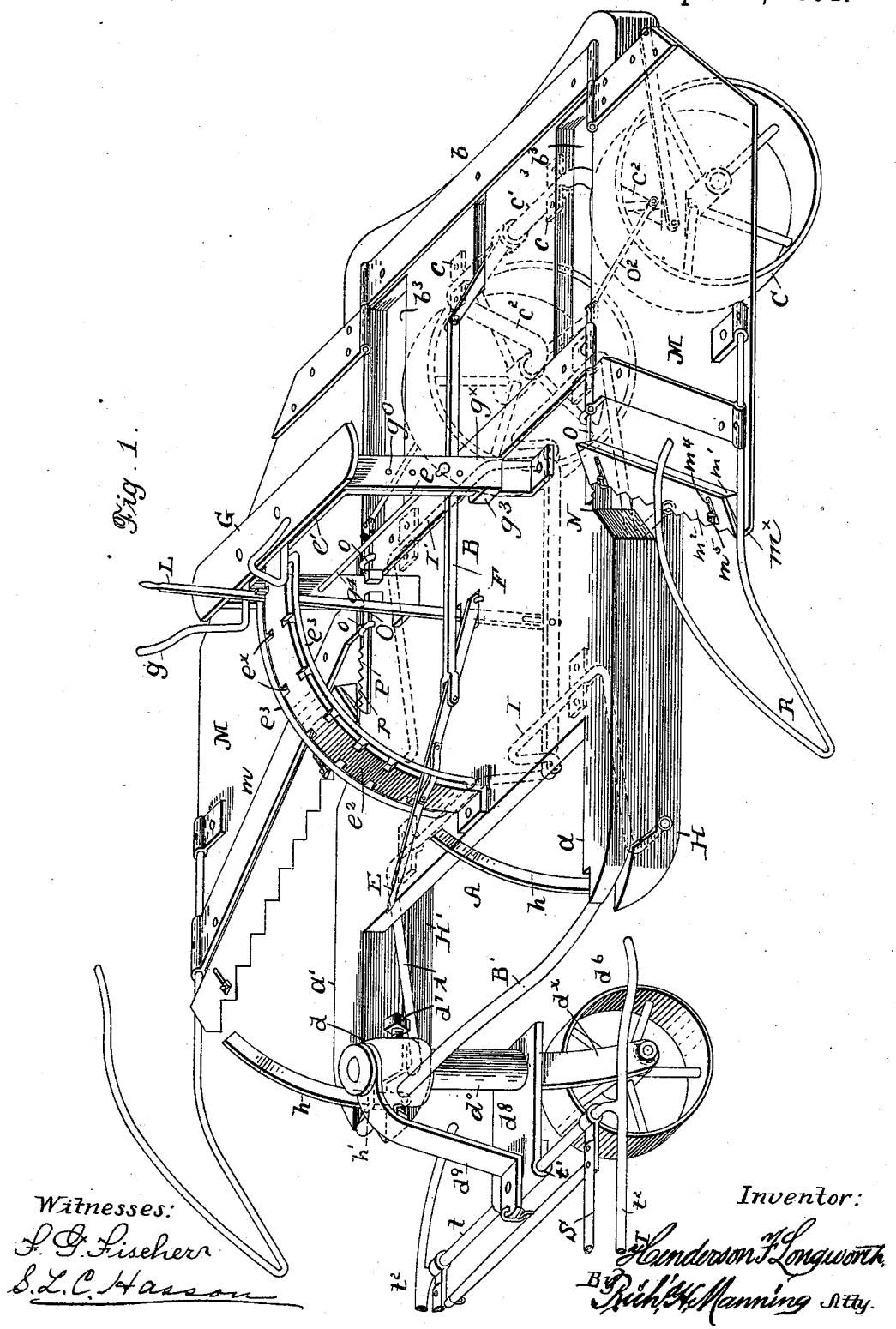
Witnesses:
F. G. Fischer
S. L. C. Hasson
Inventor:
Henderson F. Longworth
By Rich. H. Manning Atty.

(No Model.) 2 Sheets—Sheet 2.
H. F. LONGWORTH.
STALK FODDER HARVESTER.
No. 450,244. Patented Apr. 14, 1891.
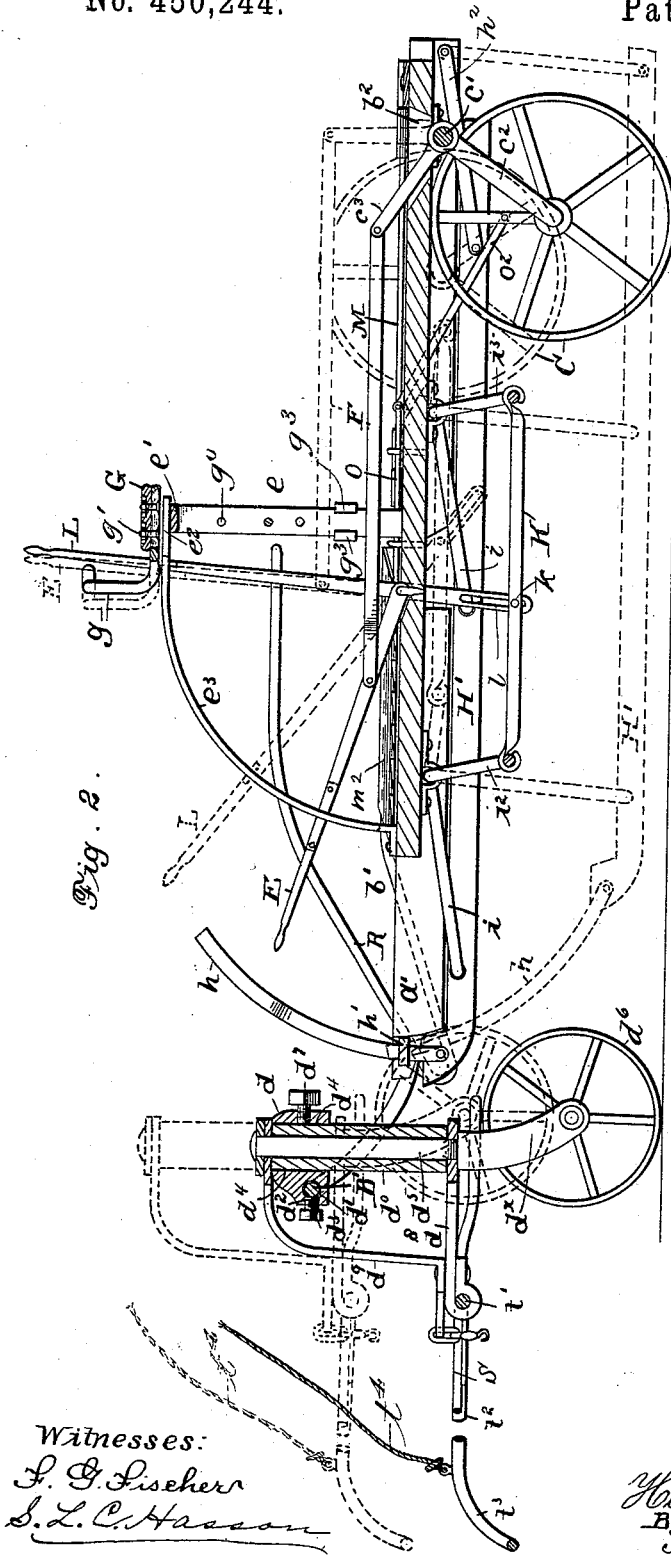
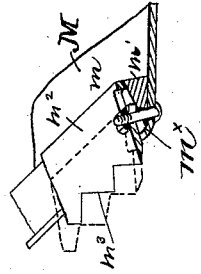
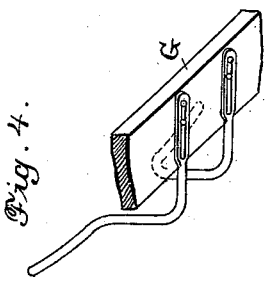
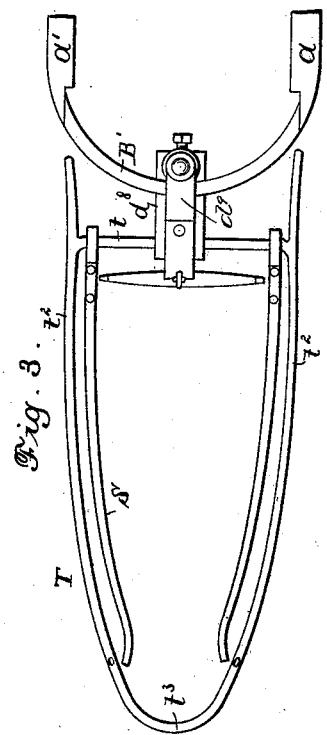
Witnesses:
J. G. Fischer
S. L. C. Hasson
Inventor:
Henderson F. Longworth
By Rich't H. Manning Atty.

UNITED STATES PATENT OFFICE.

HENDERSON F. LONGWORTH, OF BELOIT, KANSAS.

STALK-FODDER HARVESTER.

SPECIFICATION forming part of Letters Patent No. 450,244, dated April 14, 1891.

Application filed July 14, 1890. Serial No. 358,775. (No model.)

*To all whom it may concern:*

Be it known that I, HENDERSON F. LONGWORTH, a citizen of the United States, residing at Beloit, in the county of Mitchell and State of Kansas, have invented certain new and useful Improvements in Stalk-Fodder Harvesters; and I do hereby declare that the following is a full, clear, and exact description of the same, such as will enable others to make and use the same, reference being had to the accompanying drawings, forming a part of this specification.

The object of my invention is, first, to raise the fallen stalks of the fodder in an upright position in advance of the harvester and support the same until it is conducted to the stalk-cutter; second, in a fodder-stalk harvester having a winged shear-cutter to prevent clogging of grass between the cutter and the guide-bar; third, to retain the upright position of the stalk-fodder in line with the cutter; fourth, to adjust the leading draft-wheel in position in the line of draft toward the side of the harvester; fifth, to change the angle of the cutter-bar as the separate stalks of the fodder increase in thickness; sixth, to prevent the operator from being thrown from the seat in bunching the cut stalks of the fodder.

My invention further consists in the novel construction and combination of parts, which will first be fully described, and specifically pointed out in the claims.

In the drawings, Figure 1 is a view in perspective of the stalk-fodder harvester in an operative position, showing the guide-frame in advance of the harvester, and also in dotted lines the crank-shaft on the rear traction-wheels, and mechanism connected therewith beneath the platform of the harvester. Fig. 2 is a longitudinal sectional view of the harvester as seen in Fig. 1. Fig. 3 is a plan view of the guide-frame in advance of the harvester and a broken view of the end portion of the harvester to which said frame is connected. Fig. 4 is a detail view of the seat on the harvester, showing the adjustable body-guard thereon. Fig. 5 is a detail view of the adjustable cutter-bar on the winged sides of the harvester.

Similar letters of reference indicate corresponding parts in all the figures.

In the construction of my improved harvester a rectangular-shaped frame A is first made of a suitable width so as to pass between parallel rows of stalk-fodder in the field which the harvester is designed to cut. Said frame A consists of a platform B, to each respective side portion of which platform, at the forward end, are attached the guide-bars $a\ a'$. Each one of the guide-bars $a\ a'$ extends a short distance beyond the forward end of the platform B, and toward the rear end of the platform B, nearly to the forward edge of the wings, hereinafter described. The side portions of the platform B, at the rear end of the harvester extend outwardly in line with the longitudinal inner side portions of the guides $a\ a'$.

To the under side portion of the platform B, at the rear end $b$, are attached the journal-boxes $c\ c$, which are placed in the transverse direction of the platform B, with their bearings in line with each other and at nearly equal distances apart from each other and from the respective longitudinal side portions of the platform B. In the journal-boxes $c\ c$ is mounted a short rock-shaft $c'$. To the respective ends of the rock-shaft $c'$ are rigidly attached the crank-axles $c^2\ c^2$, and to said axles are connected, between the said axles and said guides, the traction-wheels C C. Between the crank-axles $c^2\ c^2$ is attached a short crank $c^3$, which extends from said shaft $c'$ in nearly an opposite direction in the line of the diameter of shaft $c'$ to the crank $c^2\ c^2$, and also through the longitudinal opening $b^2$ made in the platform B, in a vertical line with said crank $c^3$. In a vertical line with the traction-wheels C in the platform B are made the longitudinal openings $b^3\ b^3$, which are of the proper size to admit the said traction-wheels.

Near the forward end of the platform B and to the extreme end portion of one guide-bar $a$ is rigidly attached one end of a supporting-bar B', which extends in the direction of said bar $a$ a short distance in an upwardly-inclined direction, and is bent at right angles toward the other bar $a'$, and the other end thence bent downwardly and connected with the said bar $a'$. On the bar B' is a laterally-adjustable lug $d$, which is perforated at $d'$ to receive the bar B', and also at $d^2$, so as to intersect the perforation $d'$, and screw-threaded to receive the adjusting-screw $d^3$. Through the lug $d$ is made in a vertical direction a circular opening $d^4$, through which is inserted a sleeve $d^0$, which surrounds the shank or pin $d^5$, the lower end of which is forked at $d^\times$ $d^\times$, and between said forked ends is journaled the swivel caster-wheel $d^6$. Through the lug $d$, intersecting with the opening $d^4$, is made a screw-threaded perforation, in which is inserted an adjusting-screw $d^7$. From the shank $d^5$, near the forked portion $d^\times$ $d^\times$, is extended in a horizontal direction a short distance a tongue-plate $d^8$, and attached to said tongue-plate at one end, and to the upper end portion of shank $d^5$ at the other, is a brace-plate $d^9$.

To the platform B are attached the standards $e$ $e$, which are placed in line in the transverse direction of said platform, and to the upper end portions of said standards is connected a transverse bar $e'$. To the bar $e'$ is connected one end portion of a segment-plate $e^2$, which extends in a curved line in the direction of the end portion $b'$ of platform B, and the other end of said plate $e^2$ is attached thereto. In both sides of the plate $e^2$ are made the notches $e^\times$. Attached to the segment-plate $e^2$, near the bar $e'$, on both sides of the said plate $e^2$ at one end, are the guide-rods $e^3$ $e^3$, the other ends of which rods are extended in the same line of direction as the plate $e^2$ toward the end portion $b'$ of platform B, and bent at right angles and secured to the said plate $d^2$.

To the platform B, beneath the end portion of the plate $e^2$, which is connected with the transverse bar $e'$ and in line with the longitudinal slot $b^2$ in said platform, is pivotally attached the lower end portion of the lever E, the upper end portion of which extends in a vertical direction on one side of the plate $e^2$ in line with said lever and within its adjacent guide-rod $e^3$. To the upper end portion of the crank $c^3$ on the axle $c'$ is pivotally attached one end of a connecting-bar F, the other end of which extends to and is pivotally attached to the side of the lever E a short distance from the lower end portion of said lever. Above the transverse bar $e'$ is arranged in the same direction a seat G and the ends of said seat extended a slight distance beyond the ends of bar $e'$. To the under side portion of the seat G, at one end of said seat, is attached the upper end portion of a supporting-bar $g^\times$, which extends in a downward direction and against the outer side portion of the standard $e$ and nearly to the platform B, and is provided with the perforations $g^0$ $g^0$ at suitable points in the longitudinal direction of the said standard. Upon the other end of the seat G is attached a similar supporting-bar $g^\times$, which is perforated in a similar manner. To the lower ends and side portions of the bars $g^\times$ $g^\times$ are attached the clasps $g^3$ $g^3$, which extend over both edge portions of the standard $e$. Through one of the perforations $g^0$ in one bar $g^\times$ and through one of the standards $e$ parallel therewith is inserted one end of a rod $g^4$, which rod also extends through the other standard $e$ and seat-support $g^\times$ adjacent thereto, whereby the seat G is adjusted in suitable position above the transverse bar $e'$. To the under side portion of the seat G a short distance from the line equidistant from the ends is attached the lower slotted end of a body-guard $g$. In the slotted end $g$ and extending into the seat G is an adjustable fastening-screw $g'$. From the end portion $g$ the said guide G extends over the forward edge of the seat, and also in a vertical direction a short distance, and thence bent in a horizontal line and in the direction of one end portion of said seat. A similar guard is attached in a like manner to the seat G and extended in the direction of the other end of seat D. In a vertical line with and beneath the guide-bars $a$ $a'$ are the vertically-adjustable guide-bars H H'.

To the under side portion of the platform B are attached the transverse crank-shafts I I', one of which is near the end portion $b'$ of said platform and the other slightly in advance of the openings $b^3$ to admit the traction-wheels C. To the ends of the respective shafts I I', near the guides $a$ $a'$, are attached the upper ends of crank-arms $i$ $i$, which are made of a sufficient length to extend within a short distance of the ground. The lower ends of the crank-arms $i$ $i$ are attached to the inner side of the guide-bars H H'. To the forward end and inner side portions of each guide-bar H H' is pivotally attached one end of a rearwardly-curved guide $h$, which guide passes upwardly and through a staple $h'$ on the inner side portion of the guide-bars $a$ $a'$. To the rear end portion of the adjustable guide-bars H H' is pivotally attached on either side one end of the brace-bars $h^2$ $h^2$, which correspond in length to the guide-bars $h$ $h$ and the other ends of said bars $h^2$ $h^2$ are pivotally attached to the rear end and under side portion of the platform B. To the respective crank-shafts I I' are attached the cranks $i^2$ $i^3$, which extend at a different angle in the line of diameter of said shafts from that of the arms $i$ $i$. To the crank $i^3$ is pivotally connected one end of a bar K, the other end of which is pivotally connected to the crank $i^2$ on shaft I. Through the platform B is extended in line with the bar K the longitudinally-slotted end portion $l$ of an operating-lever L, which is pivotally attached to said platform, and upon bar K is a pivot $k$, which enters the slot in the said portion $l$. The upper end portion of the lever L extends between the guide-rod $e^3$ and the notched plate $e^2$ on the other side of said plate, having lever E.

To both sides of the platform B and within the outer line of the guides $a$ $a'$ is hinged one longitudinal side portion of a wing M, which is sustained operatively in a horizontal position on the platform B and raised to a vertical position when not in use. The forward end portion $m$ of the wing M is cut obliquely, and is at an acute angle to the guides $a\ a'$, and a portion $m^\times$ of said end is bent and extended a short distance in an upward direction. Upon the wing M and in line with the oblique portion $m$ is a rearwardly and upwardly inclined strip $m'$. Upon the strip $m'$ and bearing $m^\times$ is placed the cutter-bar or blades $m^2$, which are made with a saw-edge $m^3$. In the blades or bar $m^2$ are the transverse slots $m^4$. Extending through the slots $m^4$ are the securing screw-bolts $m^5$, which enter suitable perforations in the wings M. At the rear end portions of bars $a\ a'$, which ends are slightly in advance of the edge of the cutter-bar $m^3$, is formed a notch N. On the platform B, near and in line with the hinged portion of the wings M, is a reciprocating rod O, which moves in the guides or staples $o\ o$, which are also in line with the openings $b^3$, which admit the traction-wheels C. To one end of the rod O is pivotally attached one end of a crank-rod $o^2$, the other end of which rod is extended in a downward direction through the opening $b^3$ in line with and attached to the outer sides of the wheels C C. To the outer end portion of rod O is rigidly attached one end of a cutter-bar P, the edge $p$ of which extends in line with the inner edge of the notch N.

To the forward end portion of the wing M, in line with the outer longitudinal edge portion, is attached rigidly one end of a yielding V-shaped gathering-rod R, which extends in advance of said wing and a suitable distance in height to retain the vertical position of the stalk-fodder as it approaches the edge of the cutter-bar. To the tongue-plate $d^8$ is pivotally attached a frame T. Said frame consists of the transverse bar $t$, which is pivotally connected to the tongue-plate $d^8$ at $t'$, and in length is nearly equal to the distance between the guides $a\ a'$, connected with the platform B. From both ends of the transverse bar $t$ extend the longitudinal bars $t^2\ t^2$, which exceed in length that of the shafts S, and the ends of the said bars $t^2\ t^2$ are rigidly connected to the respective ends of a downwardly-curved yoke $t^3$. To the frame T is connected a rope $t^4$, by means of which the said frame is elevated at the proper times. To the transverse bar $t$, between the bars $t^2\ t^2$ of frame T, are attached the rear ends of the shafts S, by means of which shafts the harvester is moved in the field.

In the operation of the harvester the wings M M are extended horizontally in position and in line with parallel rows of the stalk-fodder to be cut. Power is then applied to move the harvester, and as the frame T meets wind-broken fodder near the ground the yoke lifts the same and supports it in position, and while the harvester advances the position of the raised fodder is preserved the entire length of the bars $t^2$. The tendency of the caster-wheel to be drawn from under the bar B' when the latter is raised above the position of the plate $d^8$ is prevented by the adjusting-nut $d^3$, which prevents the turning of the lug $d$ upon the said bar B'. The lever E is then operated and the position of the platform raised to the height it is desired to cut the fodder above the line of the ground, and also the forward end of the harvester is elevated by means of lug $d$, so as to give the described angle of inclination to the wings M. In cutting heavy fodder the cutter-bars in the wings are also given an inclination on the inclined bar and pitched forward and downward and adjusted in position to meet these requirements. Upon reaching the guide-bars H H' the stalk-fodder is brought in line with the guides $a\ a'$ and the adjustable guides H H', which latter guides are operated by the lever L, so as to adjust the height of said bars above the level of the ground in the proper degree to conform to the height in which the platform B is raised to cut at variable heights and to the variety of stalks. In advance of the fodder is usually light grass, which enters the notch N in the side of the platform and is cut, and thereby prevents clogging of the cutters. When it is desired to cut one row of corn or fodder upon either one or the other side of the harvester, the draft-wheel $d^6$ is changed in position nearer one side of the platform than another and the draft applied as before. The driver, as soon as the harvester is put in motion, seats himself on the seat G and facing the fodder to be cut, and in the shock consequent to the cutter meeting the stalk, the guard $g$, which lies in position across the body, prevents the driver from being thrown from the harvester.

The harvester is designed to cut two rows of fodder, and therefore two persons are required to bunch the fodder after it is cut and tie the bunches in the usual manner. Therefore one person sits upon one end of seat G with one foot near the notch N, and with one of the guards $g$ extending across the body, as heretofore described, and upon the other end of seat G the other person is seated, also protected by the other guard $g$, and grass or weeds which crowd into the notch N are removed by the foot as the necessity requires.

Having fully described my invention, what I now claim as new, and desire to secure by Letters Patent, is—

1. In a stalk-fodder harvester, the combination, with the platform having wings attached to and extending laterally from the sides of said platform and the forward edge portion of each wing bent upward and forward, of a cutting-bar having a cutting-edge supported by the said forward edge portion of said wing, and means for adjusting the rear longitudinal edge portion of said bar upward and downward, substantially as described.

2. In a stalk-fodder harvester, the combination, with the platform having wings attached to and extending laterally from the sides of said platform and the forward edge portions of each wing bent upward and forward, of a cutter-bar having a cutting-edge upon the said forward edge portion of said wing, and a wedge interposed between said wing and the rear portion of said bar, and suitable securing nuts and bolts upon said wing connected with said cutter-bar, substantially as described.

3. In a stalk-fodder harvester having a draft-tongue plate and a platform and longitudinal guide-bars upon each side of said platform, the combination, with said tongue-plate, of a stalk-guiding frame consisting of a transverse bar pivotally connected with said tongue-plate at a point equidistant from both ends, shafts connected with said transverse bar, and longitudinal bars on both sides of said shafts nearly in line with the said longitudinal guide-bars on said platform, each connected rigidly at one end with the respective ends of the transverse bar on said tongue-plate, and the other or vibrating ends extended beyond the outer ends of said shafts, and a downwardly-curved yoke having its ends rigidly connected with the respective forward or vibrating ends of the said longitudinal side bars, and means for raising and lowering the forward end of said stalk-guide frame, substantially as described.

4. In a stalk-fodder harvester, the combination, with the platform having longitudinal guide-bars, and wings attached to and extending laterally from the said platform beyond said guide-bars, and each wing having an edge portion extending outward and forward, a cutter-bar upon the forward end of said wings, said guide-bars terminating at their rear ends in front of the wing, leaving a recess or notch in front of said cutter-bar, and a longitudinal guide attached to said platform and in line with and beneath the said guide-bars and beneath the recess or notch, substantially as described.

5. In a corn-harvester having a vertically-adjustable platform and longitudinal guide-bars upon each side of said platform, and laterally-extended wings attached to said platform and provided with cutter-bars upon the forward edge portion thereof, the combination, with said platform, of a longitudinal stalk-guide beneath said platform and in line with the outer-edge portion of said guide-bars and vertically adjustable in the manner and for the purpose described.

6. In a stalk-fodder harvester, the combination, with the platform having suitable traction-wheels at the rear end and laterally-extended stalk-cutters upon said platform, and a bar upon the forward end of said platform extending from one side of the platform to the other, of a traction-wheel supporting the forward end of said platform connected with said bar and adjustable laterally thereon, as and for the purpose described.

7. In a harvester-seat, the combination of a guide adjustably attached to said seat at one end and having the other portion extended above and also bent at an angle and extended in the direction of the outer end portion of said seat, substantially as and for the purpose described.

HENDERSON F. LONGWORTH.

Witnesses:
R. W. LUNDY,
M. M. ROWLEY.